US012559705B2

(12) United States Patent　　(10) Patent No.: US 12,559,705 B2
Salinas Fernández et al.　　(45) Date of Patent: Feb. 24, 2026

(54) PROCESS FOR PRODUCING WINE, METHOD FOR MODULATING GREEN CHARACTER OF WINE, WINE OBTAINED OR OBTAINABLE BY SUCH PROCESS OR METHOD, AND USE OF A VINE-SHOOT MATERIAL AS WINEMAKING ADDITIVE

(71) Applicant: UNIVERSIDAD DE CASTILLA LA MANCHA, Albacete (ES)

(72) Inventors: María Rosario Salinas Fernández, Albacete (ES); Cristina Cebrián Tarancón, Albacete (ES); Amaya Zalacain Aramburu, Albacete (ES); Gonzalo Luis Alonso Díaz-Marta, Albacete (ES); Francisco De Asís Fernández Roldán, Villarrobledo (ES)

(73) Assignee: UNIVERSIDAD DE CASTILLA LA MANCHA, Albacete (ES)

( * ) Notice: Subject to any disclaimer, the term of this patent is extended or adjusted under 35 U.S.C. 154(b) by 297 days.

(21) Appl. No.: 18/258,006

(22) PCT Filed: Nov. 23, 2021

(86) PCT No.: PCT/EP2021/082717
§ 371 (c)(1),
(2) Date: Jun. 16, 2023

(87) PCT Pub. No.: WO2022/128367
PCT Pub. Date: Jun. 23, 2022

(65) Prior Publication Data
US 2024/0052278 A1　　Feb. 15, 2024

(30) Foreign Application Priority Data
Dec. 18, 2020　(EP) ..................................... 20383122

(51) Int. Cl.
*C12G 1/022*　　(2006.01)
*C12H 1/22*　　(2006.01)

(52) U.S. Cl.
CPC ............. *C12G 1/0203* (2013.01); *C12H 1/22* (2013.01); *C12G 2200/21* (2013.01)

(58) Field of Classification Search
CPC . C12H 1/00; C12H 1/003; C12H 1/22; C12G 1/0203
See application file for complete search history.

(56) References Cited

FOREIGN PATENT DOCUMENTS

MD　　4078 C1 * 7/2011

OTHER PUBLICATIONS

"The Neural Bases of Multisensory Processes"; M. M. Murray, & M. T. Wallace (Eds.). Boca Raton (FL): CRC Press /Taylor & Francis (2012)—Chapter 35: Multimodal chemosensory interactions and perception of flavor, by J. Prescott.

Culleré et al., "Multidimensional gas chromatography-mass spectrometry determination of 3-alkyl-2-methoxypyrazines in wine and must. A comparison of solid-phase extraction and headspace solid-phase extraction methods", Journal of Chromatography A, 1216 (2009) 4040-4045.

De Boubée et al., "Location of 2-Methoxy-3-isobutylpyrazine in Cabernet Sauvignon Grape Bunches and Its Extractability during Vinification", American Journal of Enology and Viticulture 2002, 53(1), 1-5.

Koch et al., "Fruit ripening in Vitis vinifera: light intensity beforeand not during ripening determines the concentration of2-methoxy-3-isobutylpyrazine in Cabernet Sauvignon berries", Physiologia Plantarum 2012, 145(2), 275-285.

Peng et al., "Analysis of pigmented polymers in red wine byreverse phase HPLC", Australian Journal of Grape and Wine Research 2002, 8(1), 70-75.

Sáenz-Navajas et al., "Chemo-sensory approach for the identification of chemical compounds driving green character in red wines", Food Research International 109 (2018) 138-148.

Sáenz-Navajas et al., "Relationship between Nonvolatile Composition and Sensory Properties of Premium Spanish Red Wines and TheirCorrelation to Quality Perception", Journal of Agricultural and Food Chemistry 2010, 58, 12407-12416.

Cebrián-Tarancón et al., "Assessment of vine-shoots in a model wines as enological additives", Food Chemistry 288 (2019) 86-95.

Cebrián-Tarancón et al., "Winemaking with vine-shoots. Modulating the composition of wines by using their own resources", Food Research International 121 (2019) 117-126.

European Search Report for European Application No. 20383122.7, dated Jun. 11, 2021, 10 pages.

International Search Report for International Application No. PCT/EP2021/082717, dated Feb. 24, 2022, 3 pages.

Jackson Ronald S., "Postfermentation Treatments and Related Topics" in Wine science: principles, practice, perception (2000); p. 399.

(Continued)

*Primary Examiner* — Vera Stulii
(74) *Attorney, Agent, or Firm* — CANTOR COLBURN LLP

(57) ABSTRACT

A method for modulating green character of wine, as well as wine obtainable according to the method also relates to the use of a vine-shoot material as winemaking additive for modulating green character in wine, wherein the vine-shoot material is toasted vine-shoot material. The method includes the steps of providing a vine-shoot material, which is subjected to heating at a predetermined temperature during a period in the range from 30 to 120 minutes; and subjecting a fermentable mixture to fermentation, wherein a determined concentration of the vine-shoot material results from the heating step.

12 Claims, 2 Drawing Sheets

(56)            References Cited

OTHER PUBLICATIONS

Sáenz-Navajas et al., "Access to wine experts' long-term memory to decipher an ill-defined sensory concept: the case of green red wine", Journal International des Sciences de la Vigne et du Vin 55 (2021) 69-79.
Written Opinion for International Application No. PCT/EP2021/082717, dated Feb. 24, 2022, 9 pages.

* cited by examiner

PROCESS FOR PRODUCING WINE, METHOD FOR MODULATING GREEN CHARACTER OF WINE, WINE OBTAINED OR OBTAINABLE BY SUCH PROCESS OR METHOD, AND USE OF A VINE-SHOOT MATERIAL AS WINEMAKING ADDITIVE

CROSS-REFERENCE TO RELATED APPLICATIONS

This application is a 35 U.S.C. § 371 National Stage patent application of PCT/EP2021/082717 filed 23 Nov. 2021, which claims the benefit of European patent application 20383122.7 filed 18 Dec. 2020, the disclosures of which are incorporated herein by reference in their entirety.

TECHNICAL FIELD OF THE INVENTION

The present invention relates to a process for producing wine, in particular wine having a modulated green character. Also provided is a method for modulating green character of wine, as well as wine obtained or obtainable according to said process or said method. It also relates to the use of a vine-shoot material as winemaking additive for modulating green character in wine, wherein the vine-shoot material is toasted vine-shoot material.

BACKGROUND OF THE INVENTION

It is nowadays well established that flavour in food and beverages is the result of sensory interactions between sensory active volatile and non-volatile molecules (c.f. "The Neural Bases of Multisensory Processes"; M. M. Murray, & M. T. Wallace (Eds.). Boca Raton (FL): CRC Press/Taylor & Francis (2012)—Chapter 35: Multimodal chemosensory interactions and perception of flavor, by J. Prescott).

Complex chemical reactions involving compounds found in wine such as sugars, acids and phenolic compounds, may modulate its aroma, colour, mouth-feel and taste in such a way that the final beverage properties are more pleasing to the taster, thus also positively affecting the market value of the final product. Aroma-active volatile compounds, as well as non-volatile chromophores of wine, in particular red wine, have been the subject of thorough investigation during the last decades, but there is only a scarce number of studies directed at taste-active and/or astringent-active non-volatile molecules affecting the overall perceived flavour. The presence of pyrazine-type compounds, such as such as 3-isobutyl-2-methoxypyrazine (IBMP) or 3,5-dimethyl-2-methoxypyrazine, have been found to be a major cause of low-quality score of wines (e.g. Sáenz-Navajas et al.—*Journal of Agricultural and Food Chemistry* 2010, 58, 12407-12416). Thus, many efforts have been taken in the art to minimise these compounds in grapes and wine, which have led to different technical solutions with varying degrees of success. By way of illustration, canopy treatments for controlling light intensity prior to veraison were found to significantly influence IBMP concentration in certain Cabernet Sauvignon grapes (Koch et al. *Physiologic Plantarum* 2012, 145(2), 275-285). Also, removal of bunch stems early in the winemaking process could reduce the concentration of methoxypyrazines in the final wines (e.g. de Boubée et al. *American Journal of Enology and Viticulture* 2002, 53(1), 1-5).

However, there are many wine varieties which include a very low pyrazine content (e.g. Cabernet Sauvignon varieties from certain regions of Spain or Chile, see Culleré et al.

*Journal of Chromatography A* 2009, 1216, 4040-4045), but are still under the risk of being negatively assessed by consumers any way due to their perception of a property generally referred to as "green character". Overall, this situation clearly reflects the true complexity of a wine composition from both a qualitative and quantitative viewpoint, as well as its influence on the final organoleptic characteristics of wine.

As highlighted by Sáenz-Navajas et al. (*Food Research International* 2018, 109, 138-148), due to climate change, there exists a significant difference in time between technological and phenolic maturity of grapes, the former being related to sugar and acidity content. Besides, when winemaking is carried out on the basis of grapes with an acceptable content in sugars or acids, but with immature tannins, wines with the above-mentioned green character are generated, which have reduced acceptance by the consumers. Such negative impact is even further amplified in red wines.

Several studies have been conducted through the years in order to ascertain the origin of green character, as well as to find strategies for its mitigation. The most consistent study was carried out by Sáenz-Navajas et al. (*Food Research International* 2018, 109, 138-148), which established general criteria for defining green character after carrying out a screening of a total of 54 wines having a wide range of green character levels. Green character has been found to be a highly multidimensional parameter, which is correlated to both aroma and in-mouth attributes. Specifically, it is associated to the aroma term vegetal and to mouthfeel descriptors astringency, green and dry tannins. Furthermore, the exhaustive fraction analysis carried out during the study of Sáenz-Navajas et al. revealed that the three main factors defining green character were isoamyl alcohol, proanthocyanidins and anthocyanin-derivative compounds (e.g. anthocyanin derivative pigments which were smaller than tetramers, or anthocyanin derivative pigments resistant to $SO_2$ and precipitating with ovalbumin, the latter also known as "dry tannins"). In fact, enhancement of undesirable green character was more significantly observed when these three types of compounds were simultaneously found in wine, although such undesirable property was also found, for example, in wines with a significant content of isoamyl alcohol and proanthocyanidins.

Therefore, there is a dire need in the field of winemaking for finding new technical solutions, which are suitable for industrial-scale production, which allow for the efficient modulation of green character of wines, without affecting the other organoleptic properties of wine such as the aroma profile, thus making it possible to reduce such green character and increase final consumer's acceptance of the beverage.

Cebrián-Tarancón et al. (*Food Chemistry* 2019, 288, 86-95) assessed the possibility of using vine-shoots as enological additives, by studying the effect of vine-shoots on model wine, said model wine being a synthetic formulation consisting of an ethanol/water solution and tartaric acid, adjusted to pH 3.5. However, that study was only focused on analyzing the general contribution of vine-shoots to modify the aroma, colour and healthy effect of a synthetic wine, while focusing on compounds such as ellagic acid involved in wine copigmentation and colour stabilization, the antioxidant effects of vine-shoots, and other compounds such as vanillin and guaiacol which affect odour.

On the other hand, Ronald S. in "Postfermentation Treatments and Related Topics" (in "Wine science: principles, practice, perception", 1 Jan. 2000, Elsevier, XP055810118, page 399) referred to the use of oak chips or shavings in wine aging. However, it is widely known in the art that such aging processes by no means necessarily involve a modulation in green character, and also that they are totally different and unrelated purposes. In fact, it is possible to produce an aged wine having unpleasantly high green character attributes.

SUMMARY OF THE INVENTION

In a first aspect, the invention provides a process for producing wine, in particular a wine having a modulated green character, wherein the process comprises the steps of:
    a) preparing a fermentable mixture; and
    b) subjecting the fermentable mixture to fermentation;
wherein a toasted vine-shoot material is added to the fermentable mixture before being subjected to fermentation step b), while being subjected to fermentation step b), or after being subjected to fermentation step b), preferably at a concentration which is equal to or higher than 20 g/L. Said concentration, as defined in g/L units, refers to the amount of vine-shoot material, in grams, per litre of wine.

The term "modulation" or any equivalent thereof, as used in the context of the present invention, and with particular reference to the green character of wine, means that there is a decrease in the green character of wine. As evidenced in the examples of the present invention, means for reducing green character of wine are herein advantageously provided, by successfully reducing the content of least isoamyl alcohol and co-pigmented anthocyanin compounds, which are directly linked to this organoleptic property. Said modulation of green character was surprisingly achieved by the present invention while, at the same time, the other organoleptic properties of the wine, such as the aroma profile, were not negatively affected by those of the vine-shoot material, that is, the green character of wine was reduced, without its organoleptic properties being masked by the use of the vine-shoot material which has its inherent organoleptic properties.

According to a second aspect of the invention, wine obtained or obtainable by the process according to the first aspect of the invention is provided. In a preferred embodiment, the wine according to this second aspect, which advantageously has modulated green character (i.e. it has reduced green character), may be obtained or obtainable by the process according to the first aspect of the invention.

In a third aspect, the invention provides a method for modulating green character of wine, wherein said method comprises the steps of:
    a) providing a vine-shoot material, which is subjected to heating at a predetermined temperature during a period in the range from 30 minutes to 120 minutes; and
    b) subjecting a fermentable mixture to fermentation, wherein a determined concentration of the vine-shoot material resulting from heating step a) which is equal to or higher than 20 g/L is added to the fermentable mixture before being subjected to fermentation, while being subjected to fermentation, or after being subjected to fermentation.

According to a fourth aspect of the invention, wine obtained or obtainable by the method according to the third aspect of the invention is provided.

In a fifth aspect of the invention, the use of a vine-shoot material as winemaking additive for modulating green character in wine is provided, wherein said use is at a concentration equal to or higher than 20 g/L, and wherein the vine-shoot material is toasted vine-shoot material.

DETAILED DESCRIPTION OF THE INVENTION

Figure 1:
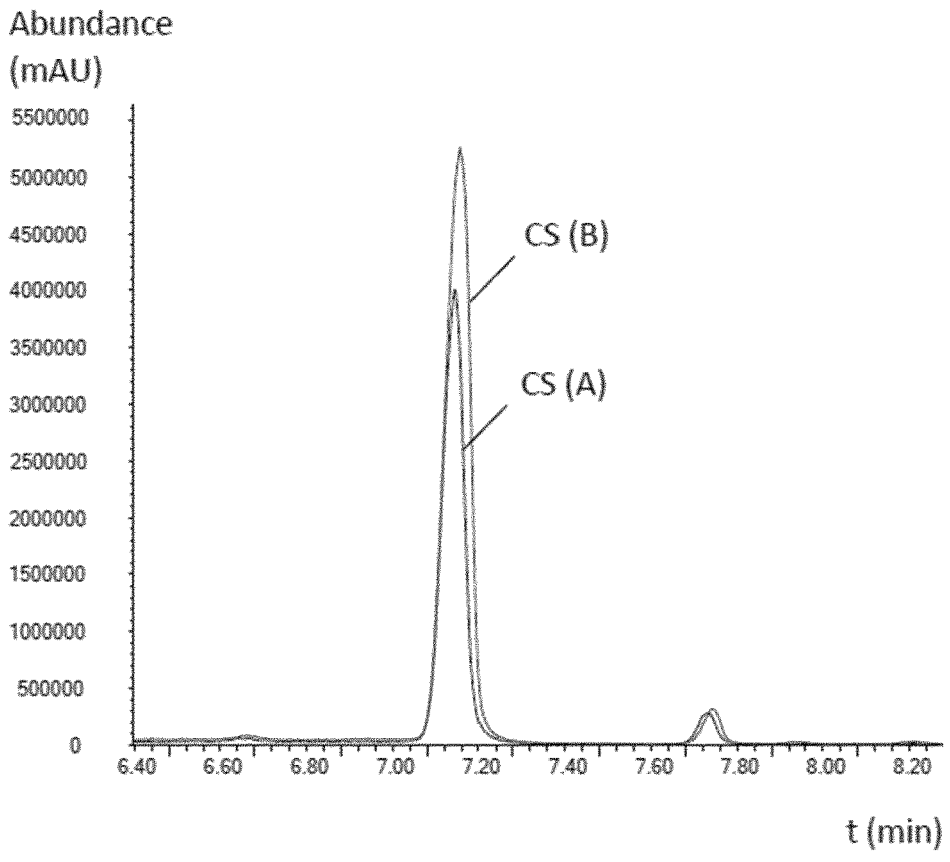
FIG. 1: GC-MS chromatogram of a sample of Cabernet Sauvignon wine (reference "CS (A)") according to the invention, which has been prepared according to the process of the invention vs GC-MS chromatogram of a sample of Cabernet Sauvignon control wine (reference "CS (B)").

According to a first aspect, the invention provides a process for producing wine, in particular a wine having a modulated green character, wherein the process comprises the steps of:
    a) preparing a fermentable mixture; and
    b) subjecting the fermentable mixture to fermentation;
wherein a toasted vine-shoot material is added to the fermentable mixture before being subjected to fermentation step b), while being subjected to fermentation step b), or after being subjected to fermentation step b), preferably at a concentration which is equal to or higher than 20 g/L.

In an embodiment, the preparation of the fermentable mixture in step a) may comprise processing grapes. Such processing of the grapes may include extracting juice from grapes, preferably, extracting juice from *Vitis vinifera* grapes, for example, by pressing. Thus, in a specific embodiment, the fermentable mixture may comprise juice extracted from grapes. In a preferred embodiment, the fermentable mixture may comprise grape juice extracted from *Vitis vinifera* grapes, in particular, by means of pressing. The processing of the grapes may also comprise first destemming the grapes and crushing them to facilitate subsequent juice extraction. In a particular embodiment, the preparation of the fermentable mixture in step a) may comprise processing grapes, wherein the processing comprises subjecting the grapes to destemming and optionally to a subsequent crushing step. In still another embodiment, the preparation of the fermentable mixture in step a) may comprise processing grapes, wherein the processing comprises i) subjecting the grapes to destemming and optionally to a subsequent crushing step, and ii) extracting juice from the grape mixture resulting from step i).

These processing steps are typically used for preparing white wines, such as Airén wines, wherein a fermentable mixture comprising clean grape juice is preferably obtained in step a) before the start of alcoholic fermentation. When the process is aimed at producing white wine, grapes may preferably be white grapes, still more preferably *Vitis vinifera* white grapes.

When producing red wine or rosé wine, a direct fermentation in contact with seeds and skin is typically carried out, the difference being that fermentation in rosé wine production is carried out at lower temperatures and shorter amounts of time, e.g. 2 to 24 hours, compared to red wine fermentation, so that the grape skin contact is minimal and thus the transfer of colour and intensity from grape skins is less intense than in red wine manufacturing. Thus, in a specific embodiment, the fermentable mixture may comprise juice extracted from grapes (i.e. grape juice) in combination with at least one of grape seeds and grape skin. In a preferred embodiment, the fermentable mixture may comprise grape juice, grape seeds and grape skin. In still another preferred embodiment, the fermentable mixture may comprise juice extracted from *Vitis vinifera* grapes (i.e. *Vitis vinifera* grape juice) in combination with at least one of *Vitis vinifera* grape seeds and *Vitis vinifera* grape skin. In still even another preferred embodiment, the fermentable mixture may comprise *Vitis vinifera* grape juice, *Vitis vinifera* grape seeds and *Vitis vinifera* grape skin. When the process is aimed at producing red or rosé wine, grapes may preferably be red grapes, still more preferably *Vitis vinifera* red grapes.

Examples of suitable *Vitis vinifera* grapes to be used in the process according to the first aspect of the invention include, but are not limited to, Cabernet Sauvignon, Tempranillo, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino, Pedro Ximenez and any clone thereof, such as the Tempranillo clone with D. O Castilla-La Mancha known as Cencibel. In a specific embodiment, the grapes are grapes of a *Vitis vinifera* variety which is selected from the group consisting of Cabernet Sauvignon, Tempranillo, Merlot, Bobal, Monastrell, Graciano, Airén, Macabeo, Verdejo, Cariñena, Pinot Noir, Syrah (also known as Shiraz), Cabernet Franc, Sauvignon Blanc, Viognier, Garnacha, Albariño, Palomino, Pedro Ximenez, and any clone thereof, such as the Tempranillo clone with D. O. Castilla-La Mancha known as Cencibel. More preferably, the grapes are *Vitis vinifera* grapes of a *Vitis vinifera* variety which is selected from the group consisting of Merlot, Airén, Cabernet Sauvignon, Tempranillo and any clone thereof, such as the Tempranillo clone with D. O. Castilla-La Mancha known as Cencibel. Still more preferably, the grapes are *Vitis vinifera* grapes of a *Vitis vinifera* variety which is selected from the group consisting of Airén, Cabernet Sauvignon, Tempranillo and Cencibel (i.e. Tempranillo clone with D. O. Castilla-La Mancha). Still even more preferably, the grapes are *Vitis vinifera* grapes of a *Vitis vinifera* variety which is selected from the group consisting of Cabernet Sauvignon, Tempranillo and Cencibel (i.e. Tempranillo clone with D. O. Castilla-La Mancha).

The expression "vine-shoot material", when used in the context in the present invention, is understood to refer to a material comprising vine-shoot fragments. In a particular embodiment, this expression may refer to a material consisting of vine-shoot fragments. Vine-shoot fragments are typically obtained from vine-shoot cultivars which may be pruned in the vineyard during the vines' dormant period (e.g. November-March in the case of Airén and Cencibel vine-shoot cultivars).

In a preferred embodiment, the vine-shoot material may comprise or consist of *Vitis vinifera* vine-shoot fragments. By way of illustration, the vine-shoot material may comprise or consist of vine-shoot fragments of a *Vitis vinifera* variety such as Cabernet Sauvignon, Tempranillo, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino, Pedro Ximenez, or any clone thereof, such as the Tempranillo clone with D. O Castilla-La Mancha known as Cencibel. In a preferred embodiment, the vine-shoot material may comprise or consist of vine-shoot fragments of a *Vitis vinifera* variety which is selected from the group consisting of Cabernet Sauvignon, Tempranillo, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino, Pedro Ximenez, and any clone thereof, such as the Tempranillo clone with D. O. Castilla-La Mancha known as Cencibel. More preferably, the vine-shoot material may comprise or consist of vine-shoot fragments of a *Vitis vinifera* variety which is selected from the group consisting of Merlot, Airén, Cabernet Sauvignon, Tempranillo and any clone thereof, such as the Tempranillo clone with D. O. Castilla-La Mancha known as Cencibel. Still more preferably, the vine-shoot material may comprise or consist of vine-shoot fragments of a *Vitis vinifera* variety which is selected from the group consisting of Airén, Cabernet Sauvignon, Tempranillo and Cencibel (i.e. Tempranillo clone with D. O. Castilla-La Mancha). Still even more preferably, the vine-shoot material may comprise or consist of vine-shoot fragments of a *Vitis vinifera* variety which is selected from the group consisting of Cabernet Sauvignon, Tempranillo and Cencibel (i.e. Tempranillo clone with D. O. Castilla-La Mancha).

Before being subjected to toasting, said vine-shoot material may have been subjected to a previous processing step wherein said vine-shoot material is cut and ground to such an extent that then toasted vine-shoot material with a desirable size may be obtained.

In a particular embodiment of this first aspect of the invention, the toasted vine-shoot material comprises vine-shoot fragments, which may preferably have a size in the range from 2 mm to 5 cm. In another embodiment, the toasted vine-shoot material may comprise vine-shoot fragments having a size in the range from 2 mm to 4 cm, from 2 mm to 3 cm, from 2 mm to 2.5 cm, from 2 mm to 2.5 cm, from 2 mm to 2 cm, from 5 mm to 1.5 cm, from 10 mm to 1.5 cm, or from 20 mm to 1.2 cm.

In another particular embodiment of this first aspect of the invention, the toasted vine-shoot material consists of vine-shoot fragments which preferably have a size in the range from 2 mm to 5 cm. In another embodiment, the toasted vine-shoot material may consist of vine-shoot fragments having a size in the range from 2 mm to 4 cm, from 2 mm to 3 cm, from 2 mm to 2.5 cm, from 2 mm to 2.5 cm, from 2 mm to 2 cm, from 5 mm to 1.5 cm, from 10 mm to 1.5 cm, or from 20 mm to 1.2 cm. Vine shoot fragments used in the present invention may be in the form of granules or chips.

According to another embodiment of this first aspect, the invention provides a process for producing wine, in particular wine having a modulated green character, wherein the process comprises the steps of:

a) preparing a fermentable mixture, wherein said preparation comprises processing grapes; and b) subjecting said fermentable mixture to fermentation; wherein a toasted vine-shoot material is added to the fermentable mixture before being subjected to fermentation step b), while being subjected to fermentation step b), or after being subjected to fermentation step b), preferably at a concentration which is equal to or higher than 20 g/L, and wherein the grapes and the vine-shoot material are from the same *Vitis vinifera* variety, said *Vitis vinifera* variety being preferably selected from the group consisting of Cabernet Sauvignon, Tempranillo, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino, Pedro Ximenez and any clone thereof, such as the Tempranillo clone with D. O Castilla-La Mancha known as Cencibel. More preferably, when the grapes and the vine-shoot material are from the same *Vitis vinifera* variety, said *Vitis vinifera* variety is preferably selected from the group consisting of Merlot, Airén, Cabernet Sauvignon, Tempranillo and any clone thereof, such as the Tempranillo clone with D. O. Castilla-La Mancha known as Cencibel. Still more preferably, when the grapes and the vine-shoot material are from the same *Vitis vinifera* variety, said *Vitis vinifera* variety is preferably selected from the group consisting of Airén, Cabernet Sauvignon, Tempranillo and Cencibel (i.e. Tempranillo clone with D. O. Castilla-La Mancha). Still even more preferably, when the grapes and the vine-shoot material are from the same *Vitis vinifera* variety, said *Vitis vinifera* variety is preferably selected from the group consisting of Cabernet Sauvignon, Tempranillo and Cencibel (i.e. Tempranillo clone with D. O. Castilla-La Mancha). In still another embodiment, the invention provides a process for producing wine, in particular wine having a modulated green character, wherein the process comprises the steps of:

a) preparing a fermentable mixture, wherein said preparation comprises processing grapes; and b) subjecting said fermentable mixture to fermentation; wherein a toasted vine-shoot material is added to the fermentable mixture before being subjected to fermentation step b), while being subjected to fermentation step b), or after being subjected to fermentation step b), preferably at a concentration which is equal to or higher than 20 g/L, wherein the grapes and the vine-shoot material are from a different *Vitis vinifera* variety, and wherein preferably each *Vitis vinifera* variety is independently selected from the group consisting of Cabernet Sauvignon, Tempranillo, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino, Pedro Ximenez, and any clone thereof, such as the Tempranillo clone with D. O. Castilla-La Mancha known as Cencibel. More preferably, when the grapes and the vine-shoot material are from a different *Vitis vinifera* variety, each *Vitis vinifera* variety is independently selected from the group consisting of Merlot, Airén, Cabernet Sauvignon, Tempranillo and any clone thereof, such as the Tempranillo clone with D. O. Castilla-La Mancha known as Cencibel. Still more preferably, when the grapes and the vine-shoot material are from a different *Vitis vinifera* variety, each *Vitis vinifera* variety is independently selected from the group consisting of Airén, Cabernet Sauvignon, Tempranillo and Cencibel (i.e. Tempranillo clone with D. O. Castilla-La Mancha). Still even more preferably, when the grapes and the vine-shoot material are from a different *Vitis vinifera* variety, each *Vitis vinifera* variety is independently selected from the group consisting of Cabernet Sauvignon, Tempranillo and Cencibel (i.e. Tempranillo clone with D. O. Castilla-La Mancha).

By the expression "toasted vine-shoot material", as used in the present invention, it is to be understood a vine-shoot material which has been previously subjected to heating at a predetermined temperature during a period in the range from 30 to 120 minutes, more preferably, which has been previously subjected to heating at a temperature in the range from 140 to 190° C. during a period in the range from 30 to 120 minutes, still more preferably during a period in the range from 30 to 75 minutes, or from 30 to 60 minutes. Before said toasting takes place, the vine-shoot material may have been stored at a determined temperature, such as room temperature (18±3° C.), preferably in the dark. In another embodiment, before said toasting takes place, the vine-shoot material may have been stored at a determined temperature, such as room temperature (18±3° C.), preferably in the dark, during a period of at least 1 month, or during a period of at least 3 months, or during a period of at least 6 months. In a preferred embodiment, during said storage taking place before toasting, vine-shoot fragments were kept intact, i.e. they were kept without being subject to any cutting or milling. In another embodiment, before said toasting takes place, the vine-shoot material may have been obtained from vine-shoots, wherein said vine-shoots may be first stored at a determined temperature, such as room temperature (18±3° C.), preferably in the dark, optionally followed by cutting and milling steps to provide the vine-shoot material with desirable size, which may be then subjected to toasting.

In an embodiment of the process according to the first aspect of the invention, the toasted vine-shoot material comprises or consists of a vine-shoot material which is previously toasted by being subjected to heating at a temperature in the range from 140 to 190° C. during a period in the range from 30 to 120 minutes. According to a preferred embodiment, said temperature may be in the range from 150 to 190° C., more preferably in the range from 160 to 190° C., still more preferably in the range from 160 to 185° C., or in the range from 165 to 185° C., from 175 to 185° C., from 140 to 180° C. or at a temperature of about 180° C.

The term "about" when used in the context of the present invention preceding a number and referring to it, is to be understood as designating any value lying within the range defined by the number ±5%, more preferably a range defined by the number ±2%. For example, the expression "about 10" should be construed as "within the range of 9.5 to 10.5", preferably "within the range of 9.8 to 10.2".

In another preferred embodiment, in the process according to the first aspect of the invention, said previous vine-shoot material toasting is carried out by being subjected to heating at a temperature in the range from 150 to 190° C. during a period in the range from 30 to 75 minutes, or from 30 to 60 minutes. In another preferred embodiment, said previous vine-shoot material toasting is carried out by being subjected to heating at a temperature in the range from 160 to 190° C. during a period in the range from 30 to 75 minutes, or from 30 to 60 minutes. In still another preferred embodiment, said previous vine-shoot material toasting is carried out by being subjected to heating at a temperature in the range from 160 to 185° C. during a period in the range from 30 to 75 minutes, or from 30 to 60 minutes. In a particular embodiment, said previous vine-shoot material toasting is carried out by being subjected to heating at a temperature in the range from 165 to 185° C. during a period in the range from 30 to 75 minutes, or from 30 to 60 minutes. In another particular embodiment, said previous vine-shoot material toasting is carried out by being subjected to heating at a temperature in the range from 175 to 185° C. during a period in the range from 30 to 75 minutes, or from 30 to 60 minutes. In still another particular embodiment, said previous vine-shoot material toasting is carried out by being subjected to heating at a temperature in the range from 140 to 180° C. during a period in the range from 30 to 75 minutes, or from 30 to 60 minutes. In another preferred embodiment, said previous vine-shoot material toasting is carried out by being subjected to heating at a temperature of about 180° C. during a period in the range from 30 to 75 minutes, or from 30 to 60 minutes.

Without wishing to be bound by theory, it is herein postulated that through the combination of the specific vine-shoot toasting conditions, together with the high amounts of toasted vine-shoot material (i.e. ≥20 g/L) which are specifically used in the context of the present invention, optimal conditions for reducing green character are achieved. It is believed that said combination of features may effectively produce a synergistic effect in terms of the release of certain molecular compounds from the vine-shoot material which may react with other molecules (e.g. poly-saccharides) found in wine, as well as the occurrence of complex chemical reactions simultaneously during wine-making, which eventually result in higher-value wine with advantageously reduced green character. It is postulated that isoamyl alcohol concentration was at least reduced as a result of the formation of the ester derivative isoamyl acetate. Such theory was further supported by sensory analysis carried out by a tasting panel, wherein the banana odour characterizing isoamyl acetate was clearly and unequivocally identified by panelists, as well as a significant reduction in alcoholic aroma.

According to another embodiment of the first aspect of the invention, the heating to which the vine-shoot material is being subjected to before being added to the fermentable mixture, in order to produce the toasted vine-shoot material, may take place in a convection heating device. Said heating device may advantageously be, for example, a convection oven, e.g. an air circulating oven, although other convection heating devices known in the art may also be used.

In a particularly preferred embodiment of this first aspect, the previous toasting of the vine-shoot material to produce the toasted vine-shoot material is carried out in a convection heating device, wherein the vine-shoot material is placed onto at least one sieve silk mesh which is arranged inside the device. The use of a silk mesh has been found to be particularly advantageous for the invention. Silk is known to burn at temperatures above 500° C., so that when the vine-shoot material is toasted, while placed onto the at least one sieve silk mesh, it does not advantageously burn when in direct contact with the silk. Besides, as silk does not transmit convection heat, the use of a sieve silk mesh makes it possible to overcome known heating problems associated to metal-based sieve meshes. In particular, the use of metal-based sieve meshes for heating typically results in a non-uniform heating of the material, because the temperature of those parts of the material which are in direct contact with the metal surface of the mesh is inevitably higher than that of those parts which are further away from said mesh. Specifically, it was found that uniform toasting of the vine-shoot material could be efficiently achieved by using at least one sieve silk mesh. In an embodiment, the sieve silk mesh may have a mesh size (i.e. diameter of screen perfo-rations, or maximum diameter of particles that can pass through the screen) in the range from 0.1 to 0.5 mm. Advantageously, the at least one sieve silk mesh may be removably arranged inside the convection heating device, thus also facilitating spreading of the vine-shoot material over the whole surface of the mesh, prior to its introduction into the heating device, so that more homogeneous heating may be further provided. Depending on the size of the heating device and the quantity of vine-shoot material to be toasted, it will become apparent for the skilled person that a plurality of sieve silk meshes may also be used.

The toasted vine-shoot material may be preferably added to the fermentable mixture before being subjected to fer-mentation step b), at a concentration which is in the range from 20 g/L to 40 g/L, or in the range from 20 g/L to 35 g/L, or in the range from 20 g/L to 30 g/L, or in the range from 22 g/L to 28 g/L.

In another embodiment, the toasted vine-shoot material may be preferably added to the fermentable mixture while being subjected to fermentation step b), at a concentration which is in the range from 20 g/L to 40 g/L, or in the range from 20 g/L to 35 g/L, or in the range from 20 g/L to 30 g/L, or in the range from 22 g/L to 28 g/L.

In still another embodiment, the toasted vine-shoot mate-rial may be preferably added to the fermentable mixture after being subjected to fermentation step b), at a concen-tration which is in the range from 20 g/L to 40 g/L, or in the range from 20 g/L to 35 g/L, or in the range from 20 g/L to 30 g/L, or in the range from 22 g/L to 28 g/L.

The process according to the first aspect of the invention may optionally comprise an additional maceration step, which may take place either when the toasted vine-shoot material is added to the fermentable mixture before being subjected to fermentation step b), or when the toasted vine-shoot material is added to the fermentable mixture while being subjected to fermentation step b), or when the toasted vine-shoot material is added to the mixture after being subjected to fermentation step b). In said maceration step, the vine-shoot material and the fermentable, under-fermentation or already-fermented mixture are kept in con-tact for a determined amount of time. It is postulated that, during that time, certain molecular compounds from the vine-shoot material are released, which may react with other molecules (e.g. polysaccharides) found in wine; at the same time, complex chemical reactions may take place during winemaking, also contributing to wine colour and influenc-ing the quantitative and qualitative composition of the final wine product, as well as its organoleptic profile. In a preferred embodiment, the maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days, wherein said period is calculated from the time the vine-shoot material and the fermentable or fermented mix-ture are brought into contact. Said maceration step may be preferably carried out at a temperature in the range from 18 to 25° C.

The process according to the first aspect of the invention may optionally comprise an additional maceration step, as described above, which may take place when the toasted vine-shoot material is added to the fermentable mixture before being subjected to fermentation step b), wherein the maceration step further comprises agitating the fermentable mixture, in order to obtain a substantially uniform vine-shoot material distribution or dispersion in the fermentable mixture. In another embodiment, the process according to the first aspect of the invention may optionally comprise an additional maceration step, as described above, which may take place when the toasted vine-shoot material is added to the fermentable mixture while being subjected to fermenta-tion step b), wherein the maceration step further comprises agitating the mixture, in order to obtain a substantially uniform vine-shoot material distribution or dispersion in the mixture during and after fermentation. In still another embodiment, the process according to the first aspect of the invention may optionally comprise an additional maceration step, as described above, which may take place when the toasted vine-shoot material is added to the mixture after being subjected to fermentation step b), wherein the maceration step further comprises agitating the mixture, in order to obtain a substantially uniform vine-shoot material distribution or dispersion in the mixture resulting from fermentation.

According to another embodiment of the first aspect of the invention, fermentation step b) may comprise an alcoholic fermentation, and may optionally further comprise a malolactic fermentation which may be carried out after the alcoholic fermentation.

Thus, in a particular embodiment, the invention provides a process for producing wine, in particular wine having a modulated green character, wherein the process comprises the steps of:

a) preparing a fermentable mixture; and b) subjecting said fermentable mixture to fermentation, wherein said fermentation is an alcoholic fermentation; wherein a toasted vine-shoot material is added to the fermentable mixture before being subjected to the alcoholic fermentation step or after being subjected to the alcoholic fermentation step, preferably at a concentration which is equal to or higher than 20 g/L.

According to a particular embodiment, when fermentation step b) is an alcoholic fermentation, the process according to the first aspect of the invention may comprise an additional maceration step, which may take place when the toasted vine-shoot material is added to the fermentable mixture before being subjected to alcoholic fermentation, or when the toasted vine-shoot material is added to the fermentable mixture while being subjected to alcoholic fermentation, or when the toasted vine-shoot material is added to the fermentable mixture after being subjected to alcoholic fermentation, wherein said maceration step may optionally further comprise agitating the mixture. Said maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days, wherein said period is calculated from the time the vine-shoot material and the fermentable or fermented mixture are brought into contact. Period. These specific maceration conditions have been found to be particularly suitable for white wine production. Said maceration step may be preferably carried out at a temperature in the range from 18 to 25° C.

In another embodiment, the invention provides a process for producing wine, in particular a wine having a modulated green character, wherein the process comprises the steps of:

a) preparing a fermentable mixture; and b) subjecting said fermentable mixture to fermentation, wherein said fermentation comprises a first fermentation step, which is an alcoholic fermentation, and a second fermentation step, which is a malolactic fermentation;

wherein a toasted vine-shoot material is added to the fermentable mixture before being subjected to alcoholic fermentation in step b), while being subjected to alcoholic fermentation step b), or after being subjected to malolactic fermentation in step b), preferably at a concentration which is equal to or higher than 20 g/L.

The process according to the first aspect may comprise an additional step of introducing a yeast mixture to the fermentable mixture before subjecting it to fermentation, in particular, a *Saccharomyces cerevisiae* yeast strain. Said yeast strain is typically used in alcoholic fermentation processes.

On the other hand, when fermentation step b) comprises an alcoholic fermentation and a subsequent malolactic fermentation, the process may further comprise an additional step, once alcoholic fermentation is finished and before malolactic fermentation starts, wherein a bacteria strain may be added to the fermentable mixture. Preferably, said bacteria strain is an *Oenococcus oeni* bacteria strain, which is the species of lactic acid bacteria most frequently associated with malolactic fermentation.

A fermentation step b) comprising an alcoholic fermentation, is typically carried out for producing white wines, and only for particular white wine types does it also include a malolactic fermentation. On the other hand, a fermentation step b) comprising both an alcoholic fermentation and a malolactic fermentation, is preferably used in the process for producing red wine or rosé wine.

According to a particular embodiment, when fermentation step b) comprises both an alcoholic fermentation and a malolactic fermentation, the process according to the first aspect of the invention may comprise an additional maceration step, which may take place when the toasted vine-shoot material is added to the fermentable mixture before being subjected to alcoholic fermentation, or when the toasted vine-shoot material is added to the fermentable mixture while being subjected to alcoholic fermentation, or when the toasted vine-shoot material is added to the fermentable mixture after being subjected to malolactic fermentation, wherein said maceration step may optionally further comprise agitating the mixture. Said maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days, wherein said period is calculated from the time the vine-shoot material and the fermentable or fermented mixture are brought into contact period. These specific maceration conditions have been found to be particularly suitable for red or rosé wine production. Said maceration step may be preferably carried out at a temperature in the range from 18 to 25° C.

Steps a) and b) may also be followed by an additional step c), after fermentation step b). Step c) may comprise a first storing of the mixture resulting from fermentation step b) in at least one stainless steel tank, at least one clay pot, or at least one oak barrel. Preferably, step c) may comprise a first storing of the mixture resulting from fermentation step b) in at least one clay pot or at least one oak barrel. According to a preferred embodiment, the first storing in step c) may be carried out for a period in the range from 1 to 24 months, from 3 to 12 months, from 6 to 12 months, or from 3 to 6 months. Typically, when the mixture is first stored in at least one stainless steel tank or at least one clay pot, an aging process occurs, wherein the wine evolves and may develop further its final taste and aroma profiles due to changes in its complex chemical composition through time.

In another embodiment, ageing step c) may comprise a second storing, which may optionally take place in combination with the first storing, in particular, which may take place after the first storing. In that second storing, the mixture is stored in at least one bottle for a period equal to or higher than 1 month, equal to or higher than 3 months, equal to or higher than 5 months or equal to or higher than 6 months.

The process according to the first aspect of the invention may be used for producing a wide array of wine varieties, wherein green character modulation is advantageously provided. In particular, it is possible to efficiently produce young wines with a significant modulation of the green character. Young wines are herein defined as red, rosé or white wines which are not subjected to aging (i.e. they are not subjected to a first storing in either at least one stainless steel tank or at least one clay pot). Also, when the process further comprises optional step c) including a first storing in at least one oak barrel or at least one clay pot, aged wines with modulated green character may be produced. Aged wines are herein defined as red, rosé or white wines which are subjected to aging, preferably oak aging, during a determined period. Among aged wines, a distinction may be made between roble wines and crianza wines, depending on the aging period.

In a specific embodiment, the process may comprise step c) including a first storing of the mixture resulting from fermentation step b) in at least one stainless steel tank or at least one clay pot or at least one oak barrel for a period in the range from 3 to 6 months. Such ageing time makes it possible to advantageously produce roble wines with modulated green character.

In another embodiment, the process may further comprise step c) including a first storing of the mixture resulting from fermentation step b) in at least one stainless steel tank or at least one clay pot or at least one oak barrel for a period in the range from 6 to 12 months. Such period makes it possible to advantageously produce crianza wines with modulated green character. In an embodiment, step c) further includes a second storing for a period equal to or higher than 6 months.

According to a second aspect of the invention, wine obtained or obtainable by the process according to the first aspect of the invention is provided. In a preferred embodiment, the wine according to this second aspect, which advantageously has reduced green character (i.e. it has reduced green character), may be obtained or obtainable by the process according to the first aspect of the invention, said process comprising the steps of:

a) preparing a fermentable mixture; and b) subjecting the fermentable mixture to fermentation; wherein a toasted vine-shoot material is added to the fermentable mixture before being subjected to fermentation step b), while being subjected to fermentation step b), or after being subjected to fermentation step b), preferably at a concentration which is equal to or higher than 20 g/L.

The process may be further defined according to any of the embodiments described above in reference to the first aspect of the invention.

In a particular embodiment, the wine according to this second aspect is a red wine, white wine or rosé wine, with modulated green character.

In another embodiment, the wine according to this second aspect is a wine with modulated green character which is selected from the group consisting of Cabernet Sauvignon, Tempranillo, Cencibel, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino and Pedro Ximenez wines. Preferably, the wine according to this second aspect is a wine with modulated green character which is selected from the group consisting of Cabernet Sauvignon, Tempranillo and Cencibel. The wine obtainable by the process according to the first aspect of the invention may be an aged wine or a young wine, depending on whether it has been subjected to aging after fermentation or not, respectively, as previously described. In a particular embodiment, the wine with modulated green character is an aged wine which may be a roble wine or a crianza wine, depending on the total time length of the aging period taking place after fermentation, as previously described.

The wine obtained or obtainable by the process according to the first aspect of the invention, may advantageously have a reduced concentration of at least one of isoamyl alcohol, proanthocyanidins and anthocyanin-derivative compounds, wherein anthocyanin-derivative compounds comprise anthocyanin derivative pigments resistant to $SO_2$ which precipitate with ovalbumin, also known as "dry tannins". In a preferred embodiment, the wine obtained or obtainable by the process according to the first aspect of the invention, may advantageously have a reduced concentration of at least two of isoamyl alcohol, proanthocyanidins and anthocyanin-derivative compounds. In another embodiment, the wine obtained or obtainable by the process according to the first aspect of the invention, may advantageously have a reduced concentration of isoamyl alcohol and anthocyanin-derivative compounds, in particular, a reduced concentration of isoamyl alcohol and co-pigmented anthocyanins. The expression "reduced concentration" is to be understood, in the context of this second aspect of the invention, as a significant decrease in the concentration of specified compounds as found in resulting wine, compared to the concentration of those same specified compounds as found in control wine, that is, wine which has not been subjected to the process according to the first aspect of the invention.

In a third aspect, the invention provides a method for modulating green character of wine, wherein said method comprises the steps of:

a) providing a vine-shoot material, which is subjected to heating at a predetermined temperature during a period in the range from 30 minutes to 120 minutes; and b) subjecting a fermentable mixture to fermentation, wherein a determined concentration of the vine-shoot material resulting from heating step a) which is equal to or higher than 20 g/L is added to the fermentable mixture before being subjected to fermentation, while being subjected to fermentation, or after being subjected to fermentation.

By means of step a), the vine-shoot material is subjected to heating at a predetermined temperature during a period which is sufficient to provide the toasted vine-shoot material.

In a preferred embodiment, the method according to the third aspect may further comprise an additional step which comprises preparing the fermentable mixture, which is later subjected to fermentation in step b). Said preparation of the fermentable mixture may first comprise processing grapes. The processing of the grapes may include extracting juice from grapes, preferably from *Vitis vinifera* grapes, for example, by pressing. Thus, in a specific embodiment, the fermentable mixture may comprise juice extracted from grapes. In a preferred embodiment, the fermentable mixture may comprise grape juice extracted from *Vitis vinifera* grapes, in particular, by means of pressing. The processing of the grapes may also optionally include first destemming the grapes and crushing them to facilitate subsequent juice extraction. In a particular embodiment, the preparation of the fermentable mixture may comprise processing grapes, wherein the processing comprises subjecting the grapes to destemming and optionally to a subsequent crushing step. In still another embodiment, the preparation of the fermentable mixture may comprise processing grapes, wherein the processing comprises i) subjecting the grapes to destemming and optionally to a subsequent crushing step, and ii) extracting juice from the grape mixture resulting from step i).

These processing steps are typically used for modulating character of white wines, such as Airén wines, wherein a fermentable mixture comprising clean grape juice is preferably used. In the context of green character modulation of white wines, grapes may preferably be white grapes, still more preferably *Vitis vinifera* white grapes.

When modulating the green character of red wine or rosé wine, a direct fermentation in contact with seeds and skin is typically carried out, the difference being that fermentation in rosé wine production is carried out at lower temperatures and shorter amounts of time, e.g. 2 to 24 hours, compared to red wine fermentation, so that the grape skin contact is minimal and thus the transfer of colour and intensity from grape skins is less intense than in red wine modulation methods. Thus, in a specific embodiment, the fermentable mixture may comprise juice extracted from grapes (i.e. grape juice) in combination with at least one of grape seeds and grape skin. In a preferred embodiment, the fermentable mixture may comprise grape juice, grape seeds and grape skin. In still another preferred embodiment, the fermentable mixture may comprise juice extracted from *Vitis vinifera* grapes (i.e. *Vitis vinifera* grape juice) in combination with at least one of *Vitis vinifera* grape seeds and *Vitis vinifera* grape skin. In still even another preferred embodiment, the fermentable mixture may comprise *Vitis vinifera* grape juice, *Vitis vinifera* grape seeds and *Vitis vinifera* grape skin. When the process is aimed at modulating green character of red wine, grapes may preferably be red grapes, still more preferably *Vitis vinifera* red grapes.

Examples of suitable *Vitis vinifera* grapes to be used in the method according to the third aspect of the invention include, but are not limited to, Cabernet Sauvignon, Tempranillo, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino, Pedro Ximenez grapes and grapes of any clone thereof, such as grapes of the Tempranillo clone with D. O Castilla-La Mancha known as Cencibel. In a specific embodiment, the grapes are grapes of a *Vitis vinifera* variety which is selected from the group consisting of Cabernet Sauvignon, Tempranillo, Merlot, Bobal, Monastrell, Graciano, Airén, Macabeo, Verdejo, Cariñena, Pinot Noir, Syrah (also known as Shiraz), Cabernet Franc, Sauvignon Blanc, Viognier, Garnacha, Albariño, Palomino, Pedro Ximenez, and any clone thereof, such as the Tempranillo clone with D. O. Castilla-La Mancha known as Cencibel. More preferably, the grapes are grapes of a *Vitis vinifera* variety which is selected from the group consisting of Merlot, Airén, Cabernet Sauvignon, Tempranillo and any clone thereof, such as the Tempranillo clone with D. O. Castilla-La Mancha known as Cencibel. Still more preferably, the grapes are grapes of a *Vitis vinifera* variety which is selected from the group consisting of Airén, Cabernet Sauvignon, Tempranillo and Cencibel (i.e. Tempranillo clone with D. O. Castilla-La Mancha). Still even more preferably, the grapes are grapes of a *Vitis vinifera* variety which is selected from the group consisting of Cabernet Sauvignon, Tempranillo and Cencibel (i.e. Tempranillo clone with D. O. Castilla-La Mancha).

Before being subjected to heating at a predetermined temperature during a period in the range from 30 to 120 minutes, from 30 to 75 minutes, or from 30 to 60 minutes, said vine-shoot material may have been subjected to a processing step wherein said vine-shoot material is cut and ground until a desired size is obtained.

The vine-shoot material used in the method according to the third aspect of the invention may comprise vine-shoot fragments preferably having a size in the range from 2 mm to 5 cm. In another embodiment, the vine-shoot material may comprise vine-shoot fragments having a size in the range from 2 mm to 4 cm, from 2 mm to 3 cm, from 2 mm to 2.5 cm, from 2 mm to 2.5 cm, from 2 mm to 2 cm, from 5 mm to 1.5 cm, from 10 mm to 1.5 cm, or from 20 mm to 1.2 cm.

The vine-shoot material used in the method according to the third aspect of the invention may consist of vine-shoot fragments preferably having a size in the range from 2 mm to 5 cm. In another embodiment, the vine-shoot material may consist of vine-shoot fragments having a size in the range from 2 mm to 4 cm, from 2 mm to 3 cm, from 2 mm to 2.5 cm, from 2 mm to 2.5 cm, from 2 mm to 2 cm, from 5 mm to 1.5 cm, from 10 mm to 1.5 cm, or from 20 mm to 1.2 cm.

According to one embodiment of the third aspect, the vine-shoot material is subjected to heating at a predetermined temperature during a period in the range from 30 to 75 minutes. Preferably, the vine-shoot material is subjected to heating at a predetermined temperature during a period in the range from 30 to 60 minutes. The predetermined temperature may be in the range from 140 to 190° C., from 150 to 190° C., from 160 to 190° C., from 160 to 185° C., from 165 to 185° C., from 175 to 185° C., from 140 to 180° C. or at a temperature of about 180° C. In an embodiment of the method according to the third aspect of the invention, the vine-shoot material is subjected to heating in step a) at a temperature in the range from 140 to 190° C. during a period in the range from 30 to 120 minutes, or from 30 to 75 minutes, or from 30 to 60 minutes.

In another preferred embodiment, the vine-shoot material is subjected to heating in step a) at a temperature in the range from 160 to 190° C. during a period in the range from 30 to 75 minutes, or from 30 to 60 minutes. In still another preferred embodiment, the vine-shoot material is subjected to heating in step a) at a temperature in the range from 160 to 185° C. during a period in the range from 30 to 75 minutes, or from 30 to 60 minutes. In a particular embodiment, the vine-shoot material is subjected to heating in step a) at a temperature in the range from 165 to 185° C. during a period in the range from 30 to 75 minutes, or from 30 to 60 minutes. In another particular embodiment, the vine-shoot material is subjected to heating in step a) at a temperature in the range from 175 to 185° C. during a period in the range from 30 to 75 minutes, or from 30 to 60 minutes. In still another particular embodiment, the vine-shoot material is subjected to heating in step a) at a temperature in the range from 140 to 180° C. during a period in the range from 30 to 75 minutes, or from 30 to 60 minutes. In another preferred embodiment, the vine-shoot material is subjected to heating in step a) at a temperature of about 180° C. during a period in the range from 30 to 75 minutes, or from 30 to 60 minutes.

Said heating step a) is preferably carried out in a convection heating device, which may be a convection oven such as an air circulating oven. Said heating step a) may also be preferably carried out in a convection heating device, wherein the vine-shoot material is placed onto at least one sieve silk mesh, which is arranged inside the device. In particular, the sieve silk mesh may have a mesh size in the range from 0.1 to 0.5 mm. Furthermore, the at least one sieve silk mesh may removably arranged inside the convection heating device, thus also facilitating spreading of the vine-shoot material over the whole surface of the mesh, prior to its introduction into the heating device, so that more homogeneous heating may be further provided. A plurality of sieve silk meshes may be used, depending on the size of the convection heating device and the quantity of vine-shoot material to be heated.

Regarding step b) of the process according to the third aspect of the invention, the determined concentration of the vine-shoot material may also be in the range from 20 g/L to 40 g/L, or in the range from 20 g/L to 35 g/L, or in the range from 20 g/L to 30 g/L, or in the range from 22 g/L to 28 g/L.

In another embodiment, the determined concentration of the vine-shoot material may also be in the range from 20 g/L to 40 g/L, or in the range from 20 g/L to 35 g/L, or in the range from 20 g/L to 30 g/L, or in the range from 22 g/L to 28 g/L, and it is added to the fermentable mixture before the mixture is being subjected to fermentation in step b). In still another embodiment, the determined concentration of the vine-shoot material may also be in the range from 20 g/L to 40 g/L, or in the range from 20 g/L to 35 g/L, or in the range from 20 g/L to 30 g/L, or in the range from 22 g/L to 28 g/L, and it is added to the fermentable mixture after the mixture is being subjected to fermentation in step b).

The method according to the third aspect of the invention may optionally comprise an additional maceration step, which may take place either when the vine-shoot material resulting from heating step a) is added to the fermentable mixture before being subjected to fermentation, while being subjected to fermentation, or after being subjected to fermentation. In said maceration step, the vine-shoot material and the fermentable or the fermented mixture are kept in contact for a determined amount of time. It is postulated that, during that time, certain molecular compounds from the vine-shoot material are released, which may react with other molecules (e.g. polysaccharides) found in wine; at the same time, complex chemical reactions may take place during winemaking, also contributing to wine colour and influencing the quantitative and qualitative composition of the final wine product, as well as its organoleptic profile. In a preferred embodiment, the maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days, wherein said period is calculated from the time the vine-shoot material and the fermentable or fermented mixture are brought into contact. Said maceration step may be preferably carried out at a temperature in the range from 18 to 25° C.

The method according to the third aspect of the invention may optionally comprise an additional maceration step, as described above, which may take place when the vine-shoot material resulting from heating step a) is added to the fermentable mixture before being subjected to fermentation, wherein the maceration step further comprises agitating the fermentable mixture, in order to obtain a substantially uniform vine-shoot material distribution or dispersion in the fermentable mixture. In another embodiment, the process according to the first aspect of the invention may optionally comprise an additional maceration step, as described above, which may take place when the vine-shoot material resulting from heating step a) is added to the fermentable mixture while it is being subjected to fermentation, wherein the maceration step further comprises agitating the mixture, in order to obtain a substantially uniform vine-shoot material distribution or dispersion during and after fermentation. In another embodiment, the process according to the third aspect of the invention may optionally comprise an additional maceration step, as described above, which may take place when the vine-shoot material resulting from heating step a) is added to the fermentable mixture after being subjected to fermentation, wherein the maceration step further comprises agitating the mixture, in order to obtain a substantially uniform vine-shoot material distribution or dispersion in the mixture resulting from fermentation.

Fermentation in step b) of the method according to the third aspect of the invention may comprise an alcoholic fermentation, and optionally further comprise a malolactic fermentation which may be carried out after the alcoholic fermentation.

Thus, in a particular embodiment, the invention provides a method for modulating green character of wine, wherein said method comprises the steps of:

a) providing a vine-shoot material, which is subjected to heating at a predetermined temperature during a period in the range from 30 to 120 minutes; and b) subjecting a fermentable mixture to fermentation, wherein said fermentation is an alcoholic fermentation, and wherein a determined concentration of the vine-shoot material resulting from heating step a) which is equal to or higher than 20 g/L is added to the fermentable mixture before being subjected to the alcoholic fermentation step, while being subjected to the alcoholic fermentation step, or after being subjected to the alcoholic fermentation step.

According to a particular embodiment, when fermentation step b) is an alcoholic fermentation, the method according to the third aspect of the invention may comprise an additional maceration step, which may take place when the toasted vine-shoot material is added to the fermentable mixture before being subjected to alcoholic fermentation, when the toasted vine-shoot material is added to the fermentable mixture while it is being subjected to alcoholic fermentation, or when the toasted vine-shoot material is added to the fermentable mixture after being subjected to alcoholic fermentation, wherein said maceration step may optionally further comprise agitating the mixture. Said maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days, wherein said period is calculated from the time the vine-shoot material and the fermentable or fermented mixture are brought into contact. In another preferred embodiment, said maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days. These specific maceration conditions have been found to be particularly suitable for white wine. Said maceration step may be preferably carried out at a temperature in the range from 18 to 25° C.

In another embodiment, the invention provides a method for modulating green character of wine, wherein said method comprises the steps of:

a) providing a vine-shoot material, which is subjected to heating at a predetermined temperature during a period in the range from 30 to 120 minutes; and b) subjecting a fermentable mixture to fermentation, wherein said fermentation comprises a first fermentation step, which is an alcoholic fermentation, and a second fermentation step, which is a malolactic fermentation;

wherein a determined concentration of the vine-shoot material resulting from heating step a) which is equal to or higher than 20 g/L is added to the fermentable mixture before being subjected to the first fermentation step (i.e. alcoholic fermentation), while being subjected to the first fermentation step (i.e. alcoholic fermentation), or after being subjected to the second fermentation step (i.e. malolactic fermentation).

The method according to the third aspect of the invention may comprise an additional step of introducing a yeast mixture to the fermentable mixture before subjecting it to fermentation in step b), in particular, a *Saccharomyces cerevisiae* yeast strain. Said yeast strain is typically used in alcoholic fermentation processes.

On the other hand, when fermentation step b) comprises an alcoholic fermentation and a subsequent malolactic fermentation, the method may further comprise an additional step, once alcoholic fermentation is finished and before malolactic fermentation starts, wherein a bacteria strain may be added to the fermentable mixture. Preferably, said bacteria strain is an *Oenococcus oeni* bacteria strain, which is the species of lactic acid bacteria most frequently associated with malolactic fermentation.

A fermentation step b) comprising an alcoholic fermentation, is typically carried out for producing white wines, in particular in the method for modulating green character of white wines, and only for particular white varieties does it also include a malolactic fermentation. On the other hand, a fermentation step b) comprising both an alcoholic fermentation and a malolactic fermentation, is preferably used in the method for modulating green character of red wines or rosé wines.

According to a particular embodiment, when fermentation step b) comprises both an alcoholic fermentation and a malolactic fermentation, the method according to the third aspect of the invention may comprise an additional maceration step, which may take place when the toasted vine-shoot material is added to the fermentable mixture before being subjected to alcoholic fermentation, when the toasted vine-shoot material is added to the fermentable mixture while it is being subjected to alcoholic fermentation, or when the toasted vine-shoot material is added to the fermentable mixture after being subjected to malolactic fermentation, wherein said maceration step may optionally further comprise agitating the mixture. Said maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days, wherein said period is calculated from the time the vine-shoot material and the fermentable or fermented mixture are brought into contact. In another preferred embodiment, said maceration step may last for a period of at least one day, of at least from 1 to 180 days, of at least from 1 to 150 days, of at least from 10 to 180 days, of at least from 10 to 150 days, of at least from 1 to 120 days, of at least from 10 to 120 days, of at least from 15 to 120 days. These specific maceration conditions have been found to be particularly suitable for red or rosé wine. Said maceration step may be preferably carried out at a temperature in the range from 18 to 25° C.

Steps a) and b) may also be followed by additional step c), after fermentation step b). Step c) may comprise a first storing of the mixture resulting from fermentation step b) in at least one stainless steel tank, or at least one clay pot, or at least one oak barrel. Preferably, step c) may comprise a first storing of the mixture resulting from fermentation step b) in at least one clay pot or at least one oak barrel. According to a preferred embodiment, the first storing in step c) is carried out for a period in the range from 1 to 24 months, from 3 to 12 months, from 6 to 12 months, or from 3 to 6 months. Typically, when the mixture is first stored in at least one stainless steel tank or at least one clay pot, an aging process occurs, wherein the wine evolves and may develop further its final taste and aroma profiles due to changes in its complex chemical composition through time.

In another embodiment, step c) may comprise a second storing, which may optionally take place in combination with the first storing, in particular, which may take place after the first storing. In a particular embodiment, step c) further comprises a second storing wherein the mixture resulting from the first storing is stored in at least one bottle for a period equal to or higher than 1 month, equal to or higher than 3 months, equal to or higher than 5 months or equal to or higher than 6 months.

Thus, the method according to the third aspect of the invention may be used for modulating green character in a wide array of wine varieties. In particular, it is possible to significantly modulate the green character of young wines, which are red, rosé or white wines not subjected to aging. Also, when the method further comprises optional step c), including a first storing in at least one oak barrel or at least one clay pot, aged wines with modulated green character may be produced, which are red, rosé or white wines which are subjected to aging, preferably oak aging, during a determined period.

In a specific embodiment, the method may further comprise step c) including a first storing of the mixture resulting from fermentation step b) in at least one stainless steel tank or at least one clay pot or at least one oak barrel, for a period in the range from 3 to 6 months. Such ageing time makes it possible to advantageously produced roble wines with modulated green character.

In another embodiment, the method may further comprise step c) including a first storing of the mixture resulting from fermentation step b) in at least one stainless steel tank or at least one clay pot or at least one oak barrel for a period in the range from 6 to 12 months. Such ageing time makes it possible to advantageously produce crianza wines with modulated green character. In an embodiment, step c) further includes a second storing for a period equal to or higher than 6 months According to a fourth aspect of the invention, wine obtained or obtainable by the method according to the third aspect of the invention is provided. In a preferred embodiment, the wine according to this fourth aspect, which advantageously has modulated green character (i.e. it has reduced green character), may be obtained or obtainable by the method according to the second aspect of the invention, said method comprising the steps of:

a) providing a vine-shoot material, which is subjected to heating at a predetermined temperature during a period in the range from 30 minutes to 120 minutes; and b) subjecting a fermentable mixture to fermentation, wherein a determined concentration of the vine-shoot material resulting from heating step a) which is equal to or higher than 20 g/L is added to the fermentable mixture before being subjected to fermentation, while being subjected to fermentation, or after being subjected to fermentation.

The method may be further defined according to any of the embodiments described above in reference to the third aspect of the invention.

In a particular embodiment, the wine according to this fourth aspect is a red wine, white wine or rosé wine, wherein green character has been modulated.

In another embodiment, the wine according to this fourth aspect is a wine wherein green character has been modulated, which is selected from the group consisting of Cabernet Sauvignon, Tempranillo, Cencibel, Merlot, Bobal, Monastrell, Graciano, Airén, Macabeo, Verdejo, Cariñena, Pinot Noir, Syrah, Cabernet Franc, Sauvignon Blanc, Viognier, Garnacha, Albariño, Palomino and Pedro Ximenez wines. Preferably, the wine according to this fourth aspect is a wine wherein green character has been modulated which is selected from the group consisting of Cabernet Sauvignon, Tempranillo and Cencibel. The wine obtainable by the method according to the third aspect of the invention may be an aged wine or a young wine, depending on whether it has been subjected to aging after fermentation or not, respectively, as previously described. In a particular embodiment, the wine with modulated green character is an aged wine which may be a roble wine or a crianza wine, depending on the total time length of the aging period taking place after fermentation, as previously described.

The wine obtained or obtainable by the method according to the third aspect of the invention, may advantageously have a reduced concentration of at least one of isoamyl alcohol, proanthocyanidins and anthocyanin-derivative compounds, wherein anthocyanin-derivative compounds comprise anthocyanin derivative pigments resistant to $SO_2$ which precipitate with ovalbumin, also known as "dry tannins". In a preferred embodiment, the wine obtained or obtainable by the method according to the third aspect of the invention, may advantageously have a reduced concentration of at least two of isoamyl alcohol, proanthocyanidins and anthocyanin-derivative compounds. In another embodiment, the wine obtained or obtainable by the method according to the third aspect of the invention, may advantageously have a reduced concentration of isoamyl alcohol and anthocyanin-derivative compounds, in particular, a reduced concentration of isoamyl alcohol and co-pigmented anthocyanins. The expression "reduced concentration" is to be understood, in the context of this fourth aspect of the invention, as a significant decrease in the concentration of specified compounds found in resulting wine, compared to the concentration of those specified compounds found in control wine, that is, wine which has not been subjected to the method according to the third aspect of the invention.

According to a fifth aspect of the invention, the use of a vine-shoot material as winemaking additive for modulating green character in wine is provided, wherein the vine-shoot material is toasted vine-shoot material. More preferably, the use of a vine-shoot material as winemaking additive for modulating green character in wine is provided, wherein the vine-shoot material is toasted vine-shoot material, and wherein said modulation of green character comprises reducing the concentration of at least one of isoamyl alcohol, proanthocyanidins and anthocyanin-derivative compounds in wine wherein anthocyanin-derivative compounds comprise anthocyanin derivative pigments resistant to $SO_2$ which precipitate with ovalbumin, also known as "dry tannins". According to another preferred embodiment, the use of a vine-shoot material as winemaking additive for modulating green character in wine is provided, wherein the vine-shoot material is toasted vine-shoot material, and wherein said modulation of green character comprises reducing the concentration of at least two of isoamyl alcohol, proanthocyanidins and anthocyanin-derivative compounds in wine, particularly, it comprises reducing the concentration of isoamyl alcohol and anthocyanin-derivative compounds in wine. The expression "reducing the concentration" is to be understood, in the context of this fifth aspect of the invention, as the provision of a significant decrease in the concentration of specified compounds found in resulting wine, compared to the concentration of those same specified compounds as found in control wine, that is, wine which has not been subjected to the use of a vine-shoot material according to the fifth aspect of the invention.

In a preferred embodiment, the use of the vine-shoot material as winemaking additive for reducing green character in wine is at a vine-shoot material concentration equal to or higher than 20 g/L, wherein the vine-shoot material is toasted vine-shoot material. According to other particular embodiments of this fifth aspect of the invention, the use of the vine-shoot material as winemaking additive for reducing green character in wine is at a vine-shoot material concentration which is in the range from 20 g/L to 40 g/L, or in the range from 20 g/L to 35 g/L, or in the range from 20 g/L to 30 g/L, or in the range from 22 g/L to 28 g/L, wherein the vine-shoot material is toasted vine-shoot material.

According to a particular embodiment of this fifth aspect, the use of the vine-shoot material may further comprise adding said vine-shoot material to a fermentable mixture before it is being subjected to a fermentation step, or while it is being subjected to a fermentation step, or after a fermentation step. The fermentable mixture may comprise juice extracted from grapes, in particular, from *Vitis vinifera* grapes, e.g. by means of pressing.

In a particular embodiment of this fifth aspect of the invention, the toasted vine-shoot material comprises or consists of vine-shoot fragments, which may preferably have a size in the range from 2 mm to 5 cm. In another embodiment, the toasted vine-shoot material may comprise or consist of vine-shoot fragments having a size in the range from 2 mm to 4 cm, from 2 mm to 3 cm, from 2 mm to 2.5 cm, from 2 mm to 2.5 cm, from 2 mm to 2 cm, from 5 mm to 1.5 cm, from 10 mm to 1.5 cm, or from 20 mm to 1.2 cm.

According to another embodiment, the use of the vine-shoot material may further comprise adding said vine-shoot material to a fermentable mixture before it is being subjected to a fermentation step which is an alcoholic fermentation, or while it is being subjected to a fermentation step which is an alcoholic fermentation, or after it is being subjected to a fermentation step which may be an alcoholic fermentation or a malolactic fermentation.

Throughout the description and the claims, the word "comprise" and variations thereof are not intended to exclude other technical features, ingredients or steps. Additional advantages and features of the invention will become apparent to those skilled in the art upon examination of the description or may be learned by practice of the invention without undue burden.

EXAMPLES

The following examples are provided by way of illustration and shall not be construed as limiting the invention.

Example 1—Exemplary Process for Producing Wine According to the First Aspect of the Invention Fermentable mixtures were independently prepared from *Vitis vinifera* grape varieties Cabernet Sauvignon, Tempranillo and Cencibel (i.e. a Tempranillo clone with D. O Castilla-La Mancha) which had been traditionally harvested during the period of September-end October in vineyards from D. O. Mancha (Castilla-La Mancha, Spain). Vine-shoot cultivars were pruned in those vineyards from D. O. Mancha during the vines' dormant period (i.e. November-March), and then stored intact in the dark and at room temperature (18±3° C.) during six months. They were then cut and sieved to provide fragments with sizes in the range from 2 mm and 5 cm. Cutting was carried out using pneumatic scissors in order to facilitate subsequent milling, which was performed using a hammer mill (LARUS Impianti, Skid Sinte 1000, Zamora, Spain) and sieves of different sizes in the range from 2 mm to 5 cm. Subsequently, the vine-shoot fragments were subjected to a heating process (i.e. toasting process) in an Heraeus T6 air circulation oven (Hanau Deutschland) at 180° C. and 30 minutes. 300 g of vine-shoot fragments per batch were toasted in the convection heating device to favour air recirculation, wherein they were placed onto a sieve silk mesh. Once toasted, the vine-shoot fragments were stored at room temperature.

Grapes from each of the three varieties were harvested and later destemmed, crushed and vinified independently. Grape juices were fermented in contact with seeds and skin in all three examples. Vinification was performed at controlled temperature according to traditional methods, in glass tanks including a valve of release of fermentation gases. Potassium metabisulfite was added to the samples to provide a final $SO_2$ concentration of 50 mg/L. Wines were sulphited after malolactic fermentation, using a dosage of $SO_2$ 4 g/hl in all cases. Subsequently, inoculation with *Saccharomyces cerevisiae* strain Uvaferm HPS active dry yeast (Lallemand, St. Simon, France—20 g/hl) was carried out, and alcoholic fermentation (AF) was deemed complete when a residual sugar value below 1.5 g/L was determined by HPLC with refractive index detector (RID). Afterwards, wines were inoculated with commercial *Oenococcus oeni* strain Lalvin VP41 (Lallemand—1 g/hl) to perform malolactic fermentation (MF) under controlled conditions at 20° C. Malolactic fermentation was deemed complete when a malic acid concentration below 0.1 g/L was determined by HPLC-RID.

Toasted vine-shoot fragments from Cabernet Sauvignon, Tempranillo and Cencibel were each added at a concentration of 24 g/L to their own variety fermentable mixture after the wine control sample. As previously indicated, it is known in the art that both isoamyl alcohol anthocyanin-derivative compounds are key factors determining green character in wines, said character being undesirably enhanced with higher quantities of these compounds.

Isoamyl alcohol extraction was carried out using Stir Bar Sorptive Extraction (SBSE) technique, together with immersion sampling technique. 25 ml wine were transferred to a 25-ml volumetric flask and then subjected to stirring at 500 rpm for 1 hour. Subsequent analysis was performed on a gas chromatograph system coupled to a quadrupole electron ionization mass spectrometric detector (GC-MS, Agilent Technologies), equipped with a fused silica capillary column (BP21 stationary phase, 30-m length, 0.25 mm I.D. and 0.25 μm film thickness), as previously described in Cebrián-Tarancón et al. (*Food Research International* 2019, 121, 117-126). Isoamyl alcohol has a retention time ($R_t$) of 7.10 minutes (see FIG. 1 regarding Cabernet Sauvignon sample with 24 g/l vine-shoot fragment vs Cabernet Sauvignon control sample).

Analysis of co-pigmented anthocyanin content was carried out by directly injecting 20-μl wine samples in a high-performance liquid chromatograph equipped with a diode array detector (HLPC-DAD). Separation was performed on a reverse phase ACE Excel 3 C18-PFP (4.6 mm×150 mm, 3 μm particle size) and a precolumn ACE Excel HPLC Pre-column Filter 1PK (0.5 μm particle size) at 30° C. The HPLC proportion of solvents used was water/formic acid/acetonitrile (97.5:1.5:1 v/v/v) as solvent A and acetonitrile/formic acid/solvent A (78.5:1.5:20 v/v/v) as solvent B, as previously described in Cebrián-Tarancón et al. (*Food Research International* 2019, 121, 117-126). Under these analysis conditions, co-pigmented anthocyanins typically appear as a broad peak in the chromatogram area corresponding to approx. 38-42 minutes (see FIG. 2 regarding Cabernet Sauvignon sample with 24 g/l vine-shoot fragment vs Cabernet Sauvignon control sample). Quantification has been carried out according to the method of Peng et al. (*Australian Journal of Grape and Wine Research* 2002, 8(1), 70-75), which yielded the following results:

TABLE 1

| | CABERNET SAUVIGNON | | TEM-PRANILLO | | CENCIBEL | |
|---|---|---|---|---|---|---|
| | Sample | Control | Sample | Control | Sample | Control |
| Isoamyl alcohol (mg/L) | 159.9 | 170.9 | 223.6 | 233.5 | 237.3 | 250.0 |
| Co-pigmented anthocyanins (au†) | 4385.66 | 6132.8 | 4608.34 | 6756.54 | 3352.07 | 6935.35 |

†au = peak area units corresponding to anthocyanin pigments.

malolactic fermentation. Maceration lasted for 15 days (Cabernet) and 35 days (Tempranillo, Cencibel) at T=18-25° C.

Finally, vine-shoot fragments were removed from the fermented mixture, and all resulting wines were bottled during a period of 6 months.

Wine control samples of each one of the above varieties were also prepared under the same conditions, but without adding any vine-shoot material at any step of winemaking.

Figure 2:
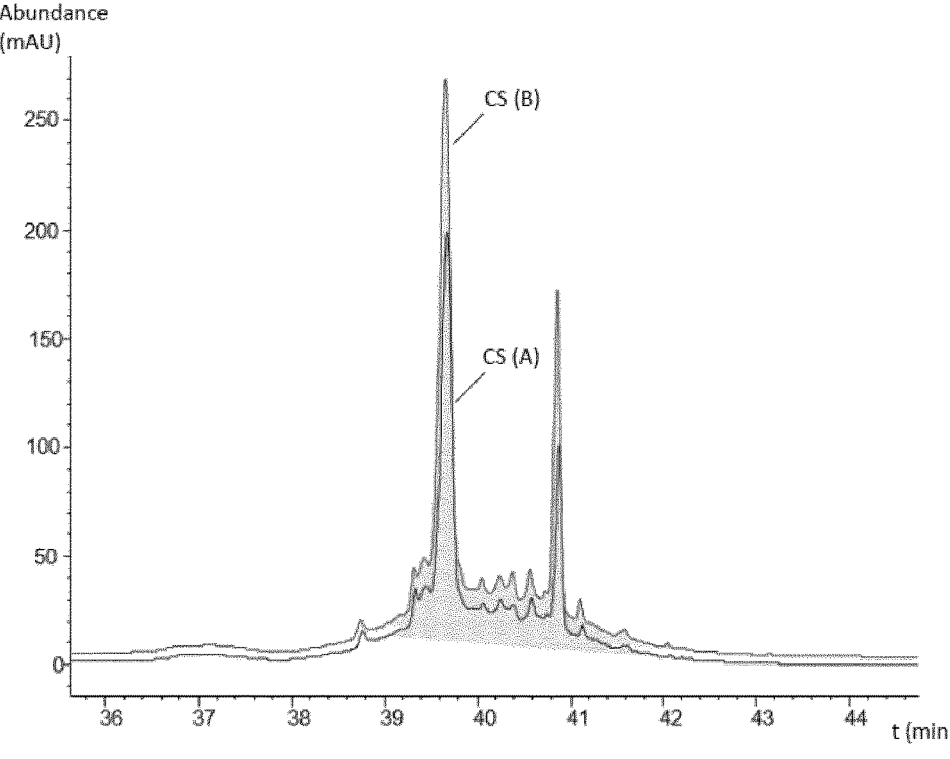
FIG. 2: HPLC-DAD chromatogram of a sample of Cabernet Sauvignon wine (reference "CS (A)", darker line) according to the invention, which has been prepared according to the process of the invention vs GC-MS chromatogram of a sample of Cabernet Sauvignon control wine (reference "CS (B)").

In order to assess the effect of using vine-shoot material on green character of wines, the contents of isoamyl alcohol (i.e. 3-methyl-1-butanol) and anthocyanin-derivative compounds, more specifically co-pigmented anthocyanins, were assessed in the above wine samples, and also compared to Results from GC-MS analysis and HPLC-DAD analysis clearly showed a significant reduction, compared to control wine, in both isoamyl alcohol and co-pigmented anthocyanin content in wines prepared according to the present invention, wherein vine-shoot material had been used in concentrations equal to or higher than 20 g/L. FIG. 1 and FIG. 2 further illustrate these differences in terms of isoamyl alcohol and co-pigmented anthocyanin content between the Cabernet Sauvignon sample treated with 24 g/l vine-shoot fragments (indicated as "CS (a)") and the control sample (indicated as "CS (b)") by GC and HPLC, respectively.

Thus, these experimental results evidence that the use of vine-shoot materials during winemaking, wherein said vine-shoot materials have been toasted under specific conditions, and are used in concentrations equal to or higher than 20 g/L, synergically results in an advantageous green character modulation in wines, that is, it results in the reduction of at least isoamyl alcohol and co-pigmented anthocyanin contents in wine. Through this modulation of green character, the present invention successfully overcomes an up-to-date unresolved problem in the art, and leads to the obtention higher-value wine with improved organoleptic properties, in particular, with improvements in terms of aroma and in-mouth attributes including aroma term vegetal and mouth-feel descriptors astringency, green and dry tannins.

Example 2—Results from Sensory Analysis Tests of Green Character of Wine Prepared According to the Invention As already mentioned, green character is defined, according to Sáenz-Navajas et al. (*Food Research International* 2018, 109, 138-148), by the aroma term vegetal and to mouthfeel descriptors astringency, green and dry tannins.

The sensory analysis test panel was comprised of 7 expert tasting specialists recruited from members of the winery wherein the wines had been produced and also members from Universidad de Castilla-La Mancha research group involved with the present invention. These panelists had extensive training and experience in sensory analysis. Prior to the tests, a homogeneous criterion for carrying out the sensory description was accorded and, also for that purpose, preliminary tests using other wines untreated with vine-shoot material were carried out as reference. Based on that, it was established that a value of 1 would correspond to the lowest perception of green character, while a value of 10 would correspond to the most intense perception of green character, wherein the green character attribute was analyzed considering the Sáenz-Navajas et al. definition of green character. Specifically, in this sensory analysis test, green character was assessed by taste analysis and identification.

Tests were carried out at a controlled temperature of approx. 22° C. and all wine samples (i.e. both wine samples treated with vine-shoot material according to the invention, and wine control samples) were presented in identical one-third full tasting glasses. Each wine sample treated with vine-shoot material was compared with its corresponding wine control sample, that is, with a sample of wine prepared under the same conditions, but without adding any vine-shoot material at any step of winemaking. Wine samples included samples of Cabernet Sauvignon, Tempranillo and Cencibel (i.e. a Tempranillo clone with D. O Castilla-La Mancha) wines, prepared using 24 g/l of vine-shoot frag-ments, generally as illustrated in example 1. Specifically, for each one of the three wine varieties, three independent wine samples were prepared, the only difference being the bottle storage time of 15, 30 and 45 days.

Figure 3:
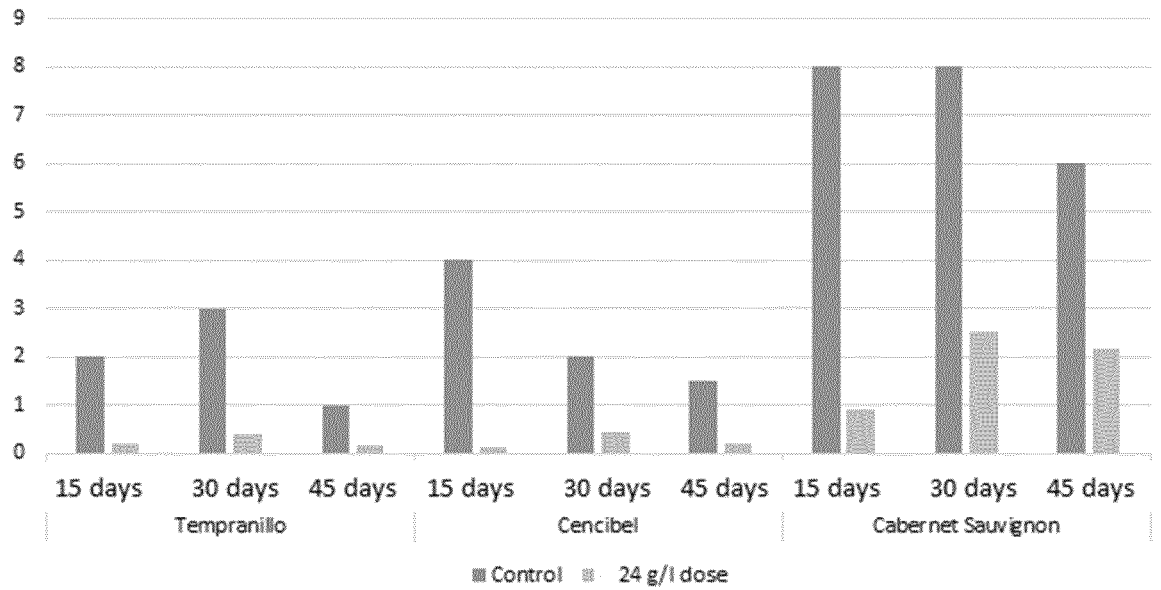
FIG. 3: Green character sensory analysis tests results for 3 Tempranillo wine samples, 3 Cencibel wine samples and 3 Cabernet Sauvignon wine samples prepared according to the process of the invention, with three different bottle storage times (15, 30, 45 days) for each variety vs green character sensory analysis tests results for 3 Tempranillo wine control samples, 3 Cencibel wine control samples and 3 Cabernet Sauvignon wine control samples, with three different bottle storage times (15, 30, 45 days).

Results are shown in FIG. 3, wherein a significant reduc-tion of green character was observed in all Tempranillo, Cencibel and Cabernet Sauvignon samples, even at different bottle storage times.

The invention claimed is:

1. A method for modulating green character of wine, characterized in that the method includes the following steps:

a) providing a vine-shoot material, which is subjected to heating at a predetermined temperature during a period in the range from 30 to 120 minutes, and b) subjecting a fermentable mixture to fermentation, wherein a determined concentration of the vine-shoot material resulting from heating step a) which is equal to or higher than 20 g/L is added to the fermentable mixture before being subjected to the fermentation, while being subjected to fermentation, or after being subjected to fermentation wherein the fermentable mixture is grape juice or a combi-nation of grape juice and at least one of grape seeds and grape skin.

2. The method according to claim 1, wherein the deter-mined concentration of the vine-shoot material is in the range from 20 g/L to 40 g/L.

3. The method according to claim 1, wherein the vine-shoot material comprises vine-shoot fragments which have a size in the range from 2 mm to 5 cm.

4. The method according to claim 1, wherein in step a), the vine-shoot material is subjected to heating at a prede-termined temperature in the range from 140 to 190° C.

5. The method according to claim 1, wherein said heating in step a) is carried out in a convection heating device.

6. The method according to claim 5, wherein the vine-shoot material is placed onto at least one sieve silk mesh which is removably arranged inside the convection heating device.

7. The method according to claim 1, wherein fermentation step b) comprises an alcoholic fermentation, and optionally further comprises a malolactic fermentation which is carried out after the alcoholic fermentation.

8. The method according to claim 1, further comprising step c) after fermentation step b), wherein said step c) comprises a first storing of the mixture resulting from fermentation step b) in at least one stainless steel tank, at least one clay pot, or at least one oak barrel.

9. The method according to claim 8, wherein step c) further comprises a second storing, wherein the mixture resulting from the first storing is stored in at least one bottle for a period equal to or higher than 1 month.

10. The method according to claim 1, further comprising step c) after fermentation b), wherein step c) comprises a storing, wherein the mixture resulting from fermentation step b) is stored in at least one bottle for a period equal to or higher than 1 month.

11. The method according to claim 1, wherein the vine-shoot material comprises vine-shoot fragments of a *Vitis vinifera* variety which is selected from the group consisting of Cabernet Sauvignon, Tempranillo, Merlot, Bobal, Monas-trell, Graciano, Airén, Macabeo, Verdejo, Cariñena, Pinot Noir, Syrah, Cabernet Franc, Sauvignon Blanc, Viognier, Garnacha, Albariño, Palomino, Pedro Ximenez, or any clone thereof.

12. A wine obtainable by the method according to claim 1, comprising a reduced concentration of isoamyl alcohol and anthocyanin-derivative compounds compared to the concentration of said isoamyl alcohol and co-pigmented anthocyanins in control wine.

* * * * *